Feb. 2, 1965    J. H. BLUMENTHAL    3,168,550
ALIPHATIC AND ALICYCLIC NITRILES
Filed May 26, 1961    4 Sheets-Sheet 1
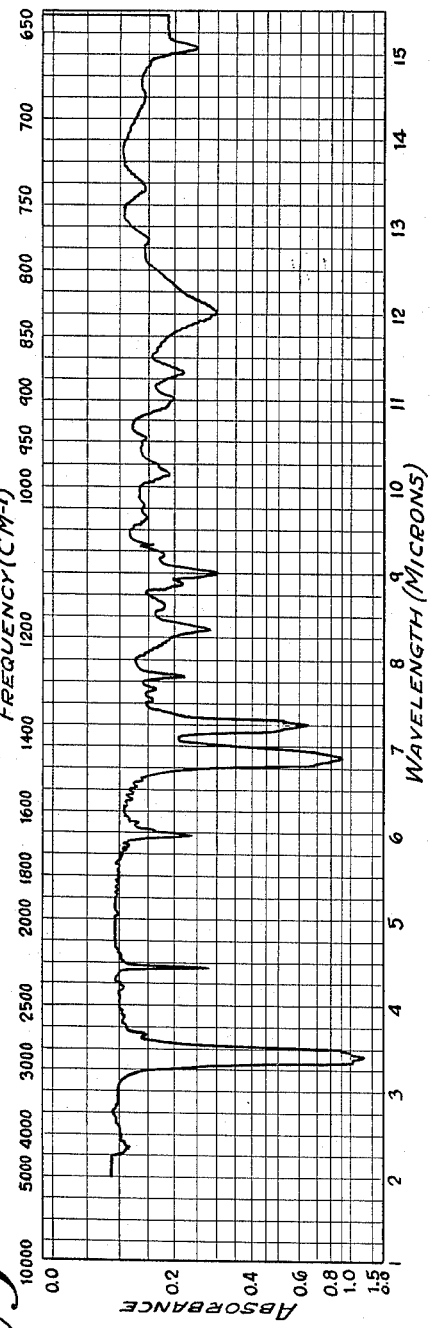
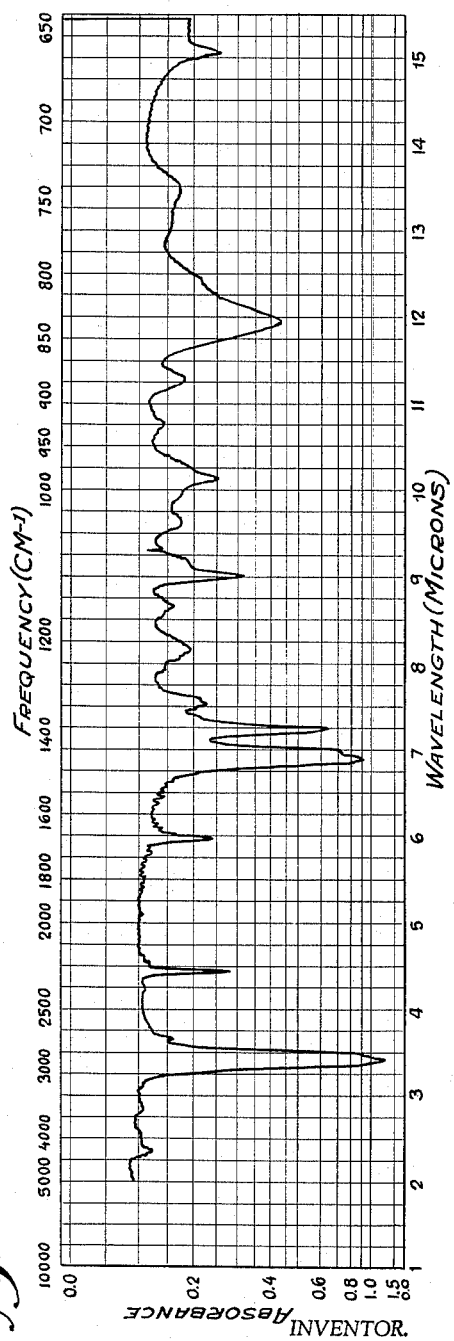
INVENTOR.
JACK H. BLUMENTHAL.
BY
*Ward, Neal, Haselton, Orme & McElhannon*
ATTORNEYS.

INVENTOR.
JACK H. BLUMENTHAL.

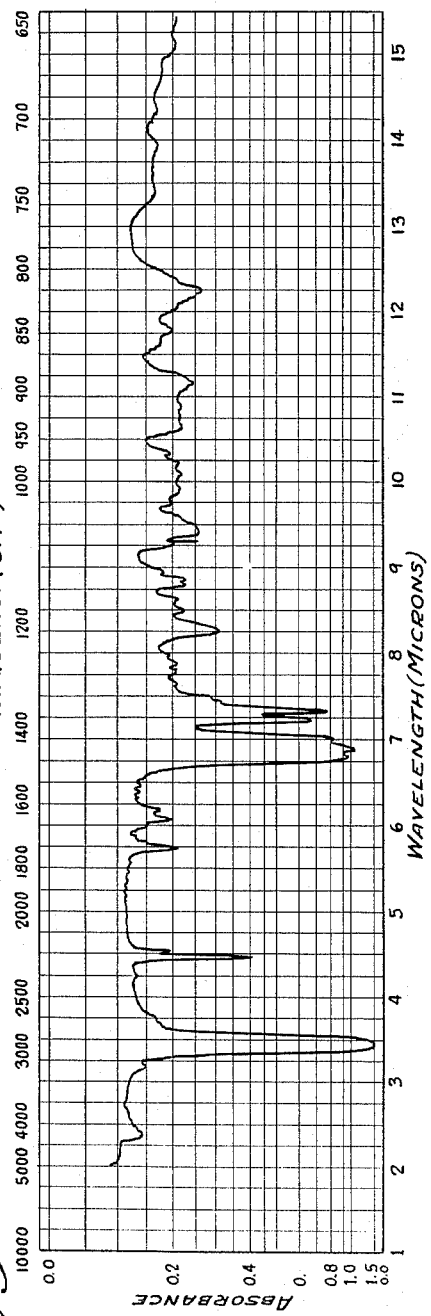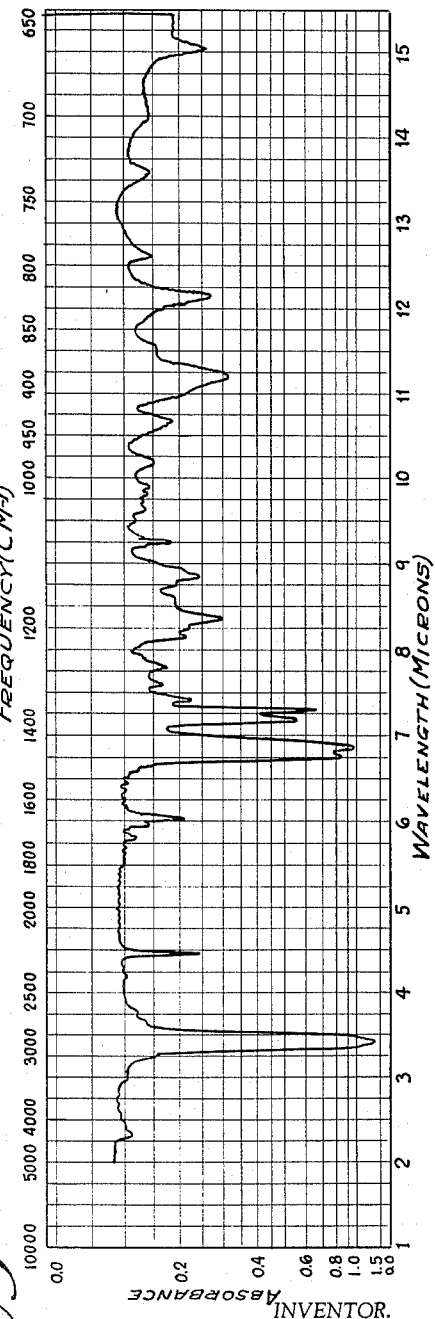

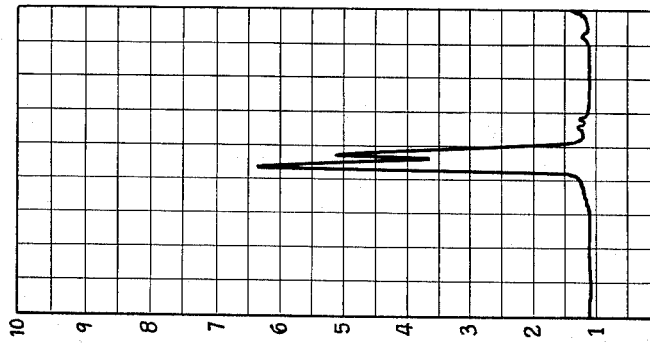
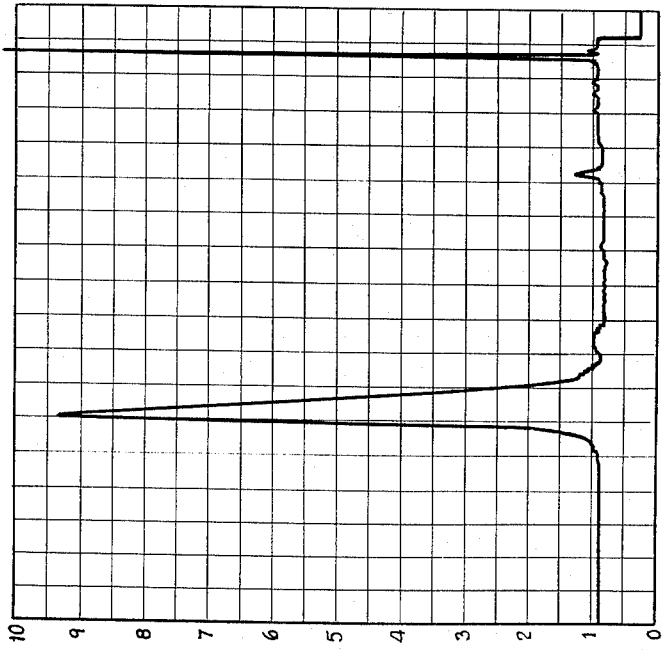

3,168,550
ALIPHATIC AND ALICYCLIC NITRILES
Jack H. Blumenthal, Oakhurst, N.J., assignor to International Flavors & Fragrances Inc., New York, N.Y., a corporation of New York
Filed May 26, 1961, Ser. No. 112,916
7 Claims. (Cl. 260—464)

This invention relates to aliphatic and alicyclic nitriles which possess odors useful in perfumery. Although organic nitriles are known, the odors of non-benzenoid nitriles known prior to my invention are substantially valueless in the perfume field, so far as I am aware.

The principal object of the invention, accordingly, is to produce a series of aliphatic and alicyclic nitriles which are perfume materials.

The invention comprises the novel products, the specific embodiments of which are described hereinafter by way of example, and in accordance with which I now prefer to practice the invention.

I have now found that certain nitriles of the general formula

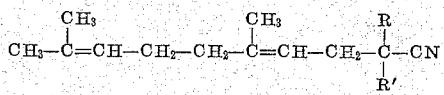

where R and R' equal H or alkyl, and the dotted lines are useful as perfume materials. Cyclization of the above nitriles by means of acid catalysts such as phosphoric acid or boron trifluoride yields monocyclic compounds of the general formula

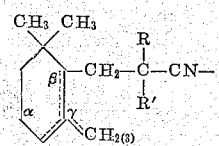

where R and R' equal H or alkyl, and the dotted lines represent various locations of a double bond to form alpha, beta and gamma isomers. With the alpha and beta isomers the group

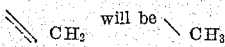

These compounds have different, but very pleasant odors which are also useful as perfume materials.

The open chain nitriles maye be synthesized by various methods, as for example the alkylation of a nitrile containing an alpha hydrogen atom with the corresponding allylic halide by means of sodamide as the condensing agent,

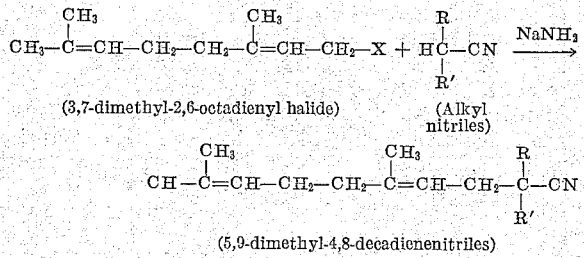

(3,7-dimethyl-2,6-octadienyl halide)   (Alkyl nitriles)

(5,9-dimethyl-4,8-decadienenitriles)

where R and R'=H or alkyl and X is chlorine or bromine; or the alkylation of a cyanoacetic ester with the corresponding allylic halide followed by hydrolysis and decarboxylation,

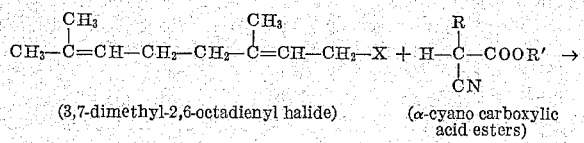

(3,7-dimethyl-2,6-octadienyl halide)   (α-cyano carboxylic acid esters)

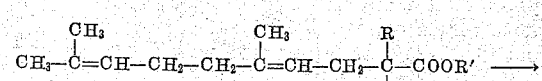

(α-3,7-dimethyl-2,6-octadienyl-α-cyano carboxylic acid esters)

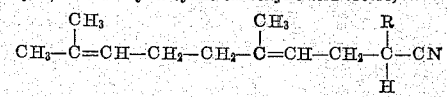

(5,9-dimethyl-4,8-decadienenitriles)

where R=H or alkyl and R'=alkyl.

The individual open chain isomeric nitriles may be obtained by the use of the individual stereoisomeric halides which may be prepared from the corresponding alcohols, nerol or geraniol. However, if a commercial mixture of nerol and geraniol is used for the preparation of the halide the final product will consist of a corresponding mixture of stereoisomeric (cis and trans) nitriles. I have found that a convenient and cheap source of the mixture of halides is the product obtained from the hydrochlorination of myrcene according to U.S. Patent 2,882,323. This procedure yields mainly a mixture of isomeric open chain primary chlorides,

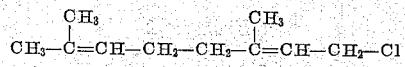

(Geranyl and neryl chlorides which are respectively trans and cis isomers)

together with a small amount of the tertiary chloride,

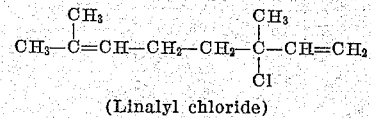

(Linalyl chloride)

The use of this mixture in reactions as outlined above yields a mixture of cis and trans nitriles formed from the primary chlorides. Depending on the procedure followed, small amounts of the tertiary isomer may also be present. However, the nitrile formed from the tertiary halide may be readily separated by fractionation from the desired primary product.

The term "geranyl" for the open chain nitriles means, unless otherwise herein specified, a mixture of the geranyl and neryl isomers. The term "cyclogeranyl" as herein referred to means a mixture of double bond isomers containing the groups viz.

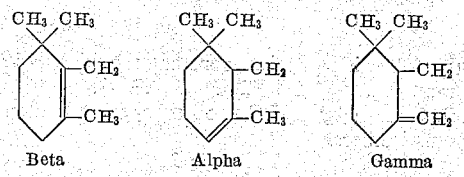

Beta    Alpha    Gamma

Example 1

(A) To a solution of the sodium salt of methyl cyanoacetate prepared from 1500 grams of methyl alcohol, 138 grams (6.0 atoms) of sodium and 891 grams (9.0 moles) of methyl cyanoacetate were added, with stirring and cooling in two hours at 3 to 5° C., 1098 grams of myrcene hydrochloride prepared from 874 grams (5.0 moles) of commercial myrcene (diene content 77.8%) and 239 grams (5.95 moles) of HCl according to U.S. Patent 2,882,323.

After being stirred for an additional two hours at 3 to 5° C., the reaction mixture was poured with stirring into 6 kg. of 19% (by weight) sulfuric acid at 20-25° C. After separation, the upper layer was washed with saturated salt solution (3×2000 grams) until neutral to litmus and then was distilled under vacuum. The distillate (1145 grams) was fractionated through a 20 cm. column packed with Beryl saddles at 3 mm. Hg. This gave 827 grams of methyl geranylcyanoacetate boiling from 132–142° C.

(B) To 2400 grams (10.24 moles) methyl geranylcyanoacetate was added with cooling and stirring, 4500 grams (11.26 moles) of 10% sodium hydroxide in one hour at 20–25° C. After stirring for another hour at 20–25° C., the mixture was poured with stirring into a mixture of 2400 grams of water, 632 grams of sulfuric acid (96%) and 1025 ml. of cumene. After stirring for ten minutes, the upper layer was separated and washed with saturated salt solution (3×3000 grams) at 40–50° C. The organic layer was then added with stirring in about 4 hours to a refluxing mixture of 1025 ml. of cumene, 3.4 grams of sodium acetate and 6.8 grams of copper powder. After refluxing for an additional hour, the cumene was distilled off at 15 mm. The residue was flash distilled and the distillate fractionated through a Vigreux column at 4 mm. Hg. There was obtained 1215 grams (78% of theory; $n_D^{20}$ 1.4700; $d_4^{20}$ 0.8675; boiling point 100° at 4 mm. Hg) of geranyl actonitrile. GLPC (gas-liquid partition chromatogram) showed two major peaks with a shoulder estimated to be about 6% linalyl isomer. The geranyl acetonitrile has the formula:

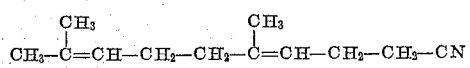

It has a sweet, fruity, rose-like odor.

*Example 2*

In a dry flask was placed five liters of benzene and 15 moles of powdered sodamide. The mixture was stirred and heated to reflux. A solution of 8.7 moles of the myrcene hydrochloride prepared as in Example 1, and 15 moles of isobutyronitrile were added to the benzene and sodamide at such a rate with stirring that reflux was maintained without external heating. The mixture was refluxed until the evolution of ammonia creased. An equal volume of water was added and the benzene layer was separated, washed with water, and the solvent and unreacted nitrile stripped off. The residual oil was distilled under vacuum and the distillate washed with twice its volume of 10% sulfuric acid, then with water until neutral. The organic layer was fractionated under vacuum to yield 1000 grams (4.85 moles) (56% of theory based on myrcene hydrochloride) of geranyl isobutyronitrile which is a perfume material having a fine peach note with floral perfume quality. The product,

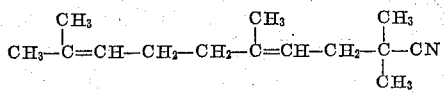

had the following physical constants: boiling point 118° at 5 mm. Hg, $n_{D20}$ 1.4642, $D_{20}^{20}$ 0.8552.

FIG. 8 shows by GLPC two peaks, representing the cis and trans isomers.

*Example 3*

As in Example 2, 4.0 liters of benzene and 10.5 moles of powdered sodamide were mixed in a flask and heated to reflux while stirring. A solution of 6.7 moles of the myrcene hydrochloride prepared as in Example 1 and 18 moles of propionitrile were added at a rate with stirring such that reflux was maintained without external heating. The mixture was refluxed, water added, the benzene layer separated, washed and stripped. This was followed by distillation under vacuum, washing and fractionation of the organic layer, all as in Example 2. The product

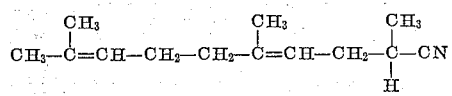

had the following physical constants: boiling point 100° at 1 mm. Hg, $n_D^{20}$ 1.4689, $D_{20}^{20}$ 0.8629. The perfume material had a floral, fruity, peach odor.

*Example 4*

As in Example 2, 0.5 liter of benzene and 1.5 moles of powdered sodamide were mixed in a flask and heated to reflux with stirring. A solution of 1 mole geranyl bromide (trans-isomer) and 1.5 moles of isobutyronitrile was added at such a rate with stirring that reflux was maintained without external heating. The mixture was then refluxed, water added, the benzene layer separated, washed, and solvent and unreacted nitrile stripped off as in Example 2. The residual oil was distilled under vacuum, and the distillate washed as in Example 2 with sulfuric acid and water. The product, geranyl isobutyronitrile (trans-isomer) is a perfume material and has a unique, fragrant, woody, peach odor. It showed only one major peak by GLPC, as will appear in FIG. 7, showing it to be a single isomer. The trans-isomer had the following physical constants: boiling point 114° C. at 3.7 mm. Hg; $n_D^{20}$ 1.4676, $D_{20}^{20}$ 0.8592.

The geranyl bromide (trans-isomer) used in this example was prepared by the following procedure:

To 472 grams of geraniol (98%) and 80 ml. of pyridine, cooled by a Dry-Ice-alcohol bath, was added, with good stirring, over a period of two hours 115 grams of phosphorous tribromide while maintaining the reaction temperature between −10 to −15° C. The mixture was allowed to warm to room temperature and then was distilled rapidly at 3 mm. Hg to yield 550 grams of distillate.

The crude product was combined with 800 ml. of petroleum ether and then washed with 600 ml. of a cold (5° C.) 3% sodium carbonate solution, followed by two water washes of 500 ml. each.

After drying over sodium sulfate, the petroleum ether was stripped off to yield 518 grams of geranyl bromide (trans-isomer).

As a check on the configuration of the bromide, it was converted back to geraniol via the acetate by reaction with potassium acetate in acetone at room temperature [(see Ruzicka and Firmenich, Helv., 22, 396 1939)], followed by saponification to the alcohol. The alcohol was identified by GLPC by comparison of its retention time with a standard sample of geraniol.

*Example 5*

In a dry flask was placed 7.3 moles of acetonitrile and 1 mole of geranyl chloride. The mixture was heated to 50° C. with stirring. Heating was discontinued and 1 mole of powdered sodamide was added in small portions (with vigorous evolution of ammonia) over a period of 35 minutes at 50–60° C. with cooling and vigorous stirring. After stirring for another half hour at 60° C., the excess acetonitrile was distilled off. The residue was washed twice with an equal volume of water, dried and distilled under vacuum. The distillate was washed with dilute sulfuric acid, then washed neutral with water, saturated bicarbonate solution and water. The washed oil was dried and fractionated under vacuum to yield a product which had a sweet, rosy, fruity odor.

There were no vinyl absorption peaks in the infrared spectrum of geranyl acetonitrile produced in this manner, and GLPC showed only two peaks in a 75:25 (trans-cis) ratio. The product had the following physical constants: boiling point 84° C. at 0.4 mm. Hg; $n_D^{20}$ 1.4707, $D_{20}^{20}$ 0.8697. The geranyl chloride used in this example was prepared as follows:

To a solution of 3 l. of dry ethyl ether and 3 kg. of linalool cooled to 0° C., was added with stirring and cooling a solution of 1.8 kg. of phosphorous trichloride in 3 liters of ether over a period of four hours while maintaining the temperature between −5 to +5° C.

The reaction mixture was poured into 15 liters of ice cold water, the oil layer separated and washed with 6 liters of cold water, followed by 6 liters of cold 5% sodium hydroxide solution and then with water again. After drying the solvent was stripped off and the crude product fractionated under vacuum. A cut boiling at 68° C. at 2 mm. Hg; $n_D^{20}$ 1.4790, $D_{15}^{15}$ 0.9254, was used for the reaction with acetonitrile. The infrared spectrum of the geranyl chloride used indicated the presence of about 10% of linalyl isomer.

*Example 6*

To a refluxing mixture of 200 grams of 85% phosphoric acid and 240 grams of benzene was added with stirring 354 grams (2.0 moles) of geranyl acetonitrile, as prepared in Example 1. After an additional reflux period of two hours, the mixture was cooled and separated at 50° C. The upper layer was washed neutral with saturated salt solution, sodium bicarbonate solution, and water. After stripping off the benzene, the residue was fractionated through a Vigreux column at 5 mm. Hg. Yield: 312 grams (90% of theory) of cyclogeranyl acetonitrile (mixture of double bond isomers) having the formula

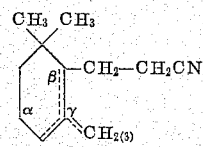

in which a double bond is in one of the dotted positions. It had the following physical constants: boiling point 108° C. at 5 mm. Hg, $n_D^{20}$ 1.4822. (Fractions bulked had a range of $n_D^{20}$ 1.4792–1.4829.) It is a perfume material having a rooty, woody, vetiver-like odor.

*Example 7*

360 grams of 85% phosphoric acid and 220 grams of benzene were heated to 65° C. in a flask. 360 grams of the product from Example 2 were added with good stirring over a period of ten minutes, and the mixture was refluxed for one hour. 220 grams of benzene were added and the mixture was stirred for one hour without heating. The benzene layer was separated and washed neutral. The solvent was stripped off and the residual oil fractionated under vacuum. The distillate weighed 290 grams and had the following physical constants: boiling point, 90° C. at 1 mm. Hg, $n_D^{20}$ 1.4767, $D_{20}^{20}$ 0.9134. The product, which had a characteristic fruity, woody odor, was shown by GLPC to consist of two major components. These were isolated, and were found from their infrared absorption curves to be the alpha (A) and gamma (B) double-bond isomers,

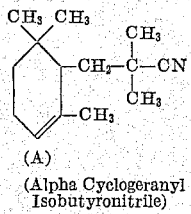 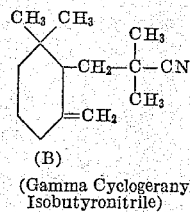

(A) (Alpha Cyclogeranyl Isobutyronitrile)     (B) (Gamma Cyclogeranyl Isobutyronitrile)

It is to be noted that a variation in the relative proportions of the various double bond isomers in the above examples will cause a variation in the physical constants given.

All temperatures herein used are expressed in ° C.

In addition to the characteristics of the compounds of the above examples, further characteristics of the compounds are shown in the accompanying drawings, in which:

FIG. 1 shows an infrared chart for geranyl isobutyronitrile as produced by Example 2.

FIG. 2 shows an infrared chart for geranyl acetonitrile as produced by Example 5.

FIG. 5 shows an infrared chart for cyclogeranyl acetonitrile as produced by Example 6.

FIG. 6 shows an infrared chart for cyclogeranyl isobutyronitrile as produced by Example 7.

FIG. 7 is a GLPC (gas-liquid partition chromatogram) chart of geranyl isobutyronitrile trans-isomer as produced by Example 4, and FIG. 8 is a GLPC chart of geranyl isobutyronitrile as produced by Example 2.

Figure 3:
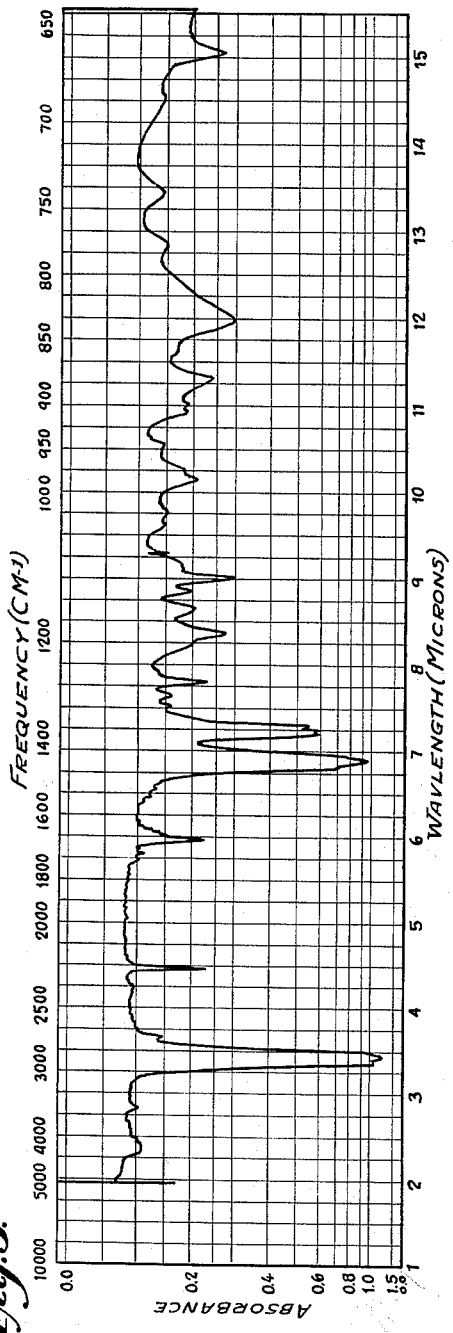
FIG. 3 shows an infrared chart for trans-isomer geranyl isobutyronitrile as produced by Example 4.
Figure 4:
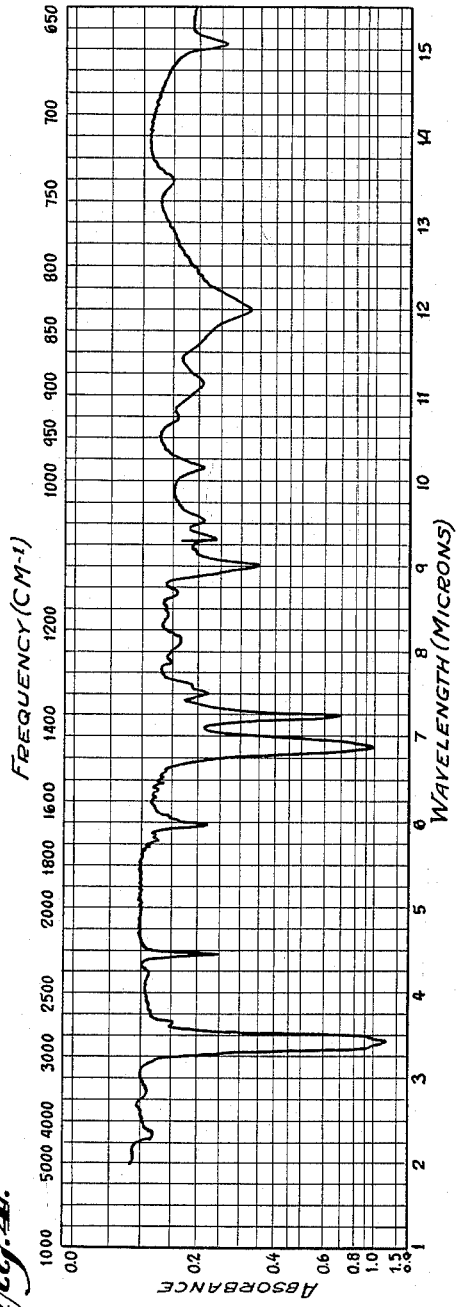
FIG. 4 shows an infrared chart for alpha geranyl propionitrile as produced by Example 3.

I claim:

1. A composition of matter selected from the group consisting of (a) 5,9-dimethyl-4,8-decadienyl nitrile monosubstituted in the 2 position by a methyl; (b) 5,9-dimethyl-4,8-decadienyl nitrile disubstituted in the 2 position by methyl groups; (c) a mixture of alpha, beta and gamma cyclogeranyl acetonitrile; and (d) a mixture of alpha and gamma cyclogeranyl isobutyronitrile.

2. Geranyl isobutyronitrile having the formula:

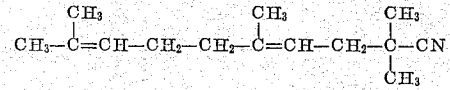

3. Alpha geranyl propionitrile having the formula:

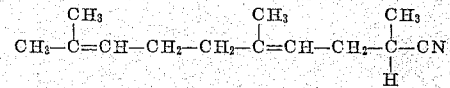

4. A mixture of alpha, beta and gamma cyclogeranyl acetonitriles having the formulae:

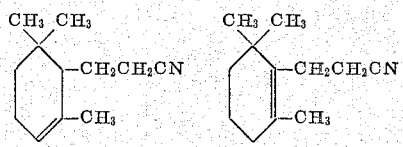

Alpha     Beta

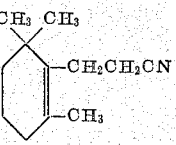

Gamma

5. Alpha cyclogeranyl isobutyronitrile having the formula:

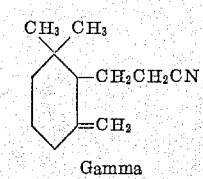

6. Gamma cyclogeranyl isobutyronitrile having the formula:

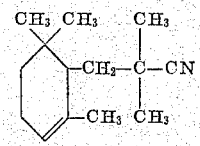

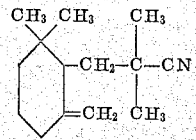

7. The trans-isomer of geranyl isobutyronitrile having the following physical characteristics: boiling point 114° C at 3.7 mm Hg, $n_D^{20}$ 1.4676, $D_{20}^{20}$ 0.8592.

References Cited in the file of this patent

Zeigler: Chemical Abstracts, vol. 26 (1932), page 5573.

Rajzmon: Chemical Abstracts, vol. 43 (1949), page 3798.

Cornforth et al.: Journal of the Chemical Society (London), page 2540, July 1959.